March 8, 1932. H. E. CURTIS 1,848,698
POWER TRANSMISSION AND CONTROLLING MEANS
Filed April 22, 1929   3 Sheets-Sheet 1
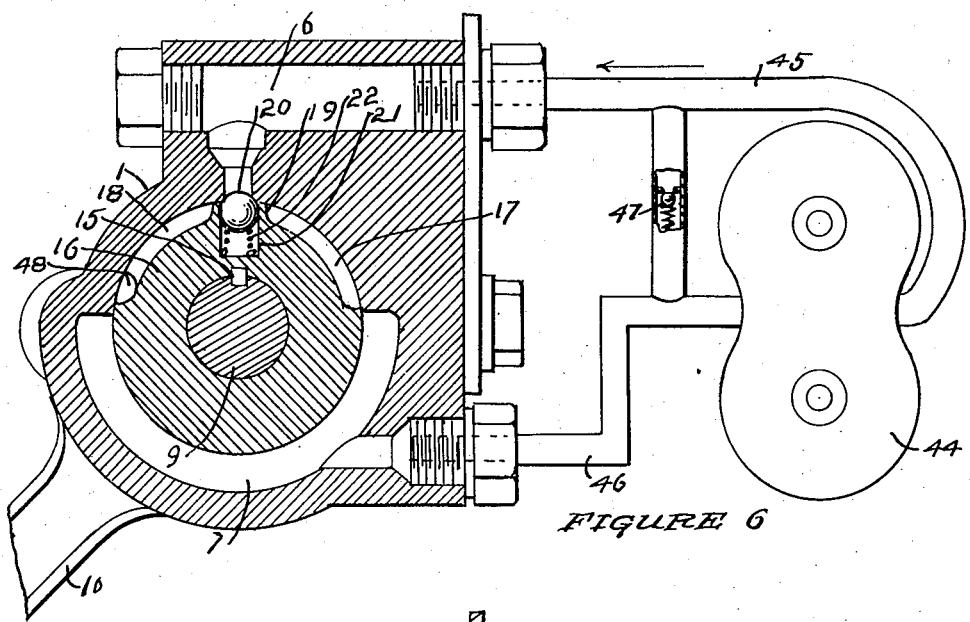
FIGURE 6
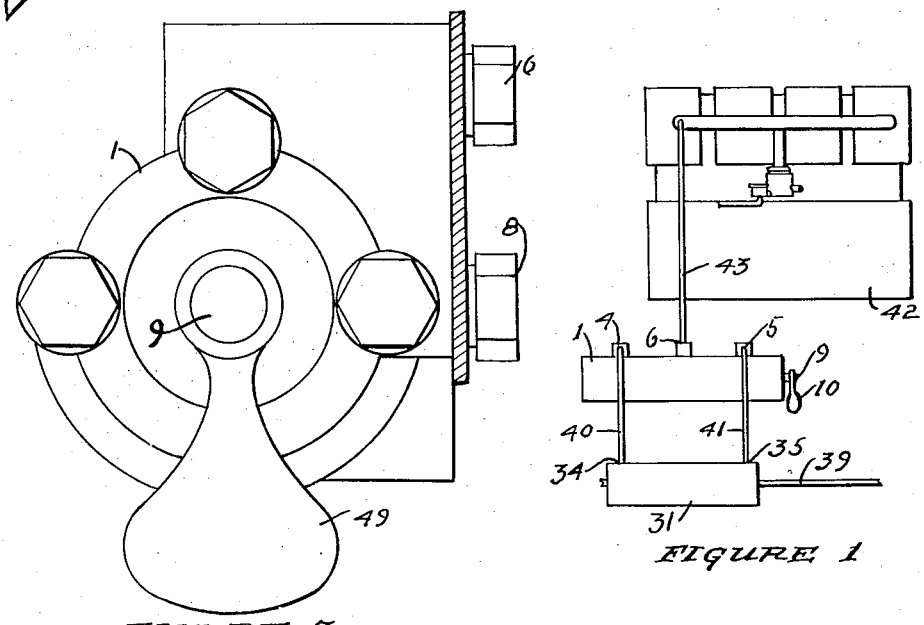
FIGURE 7
FIGURE 1
INVENTOR
Henry E. Curtis
John A. Naismith
ATTORNEY March 8, 1932. H. E. CURTIS 1,848,698
POWER TRANSMISSION AND CONTROLLING MEANS
Filed April 22, 1929 3 Sheets-Sheet 2
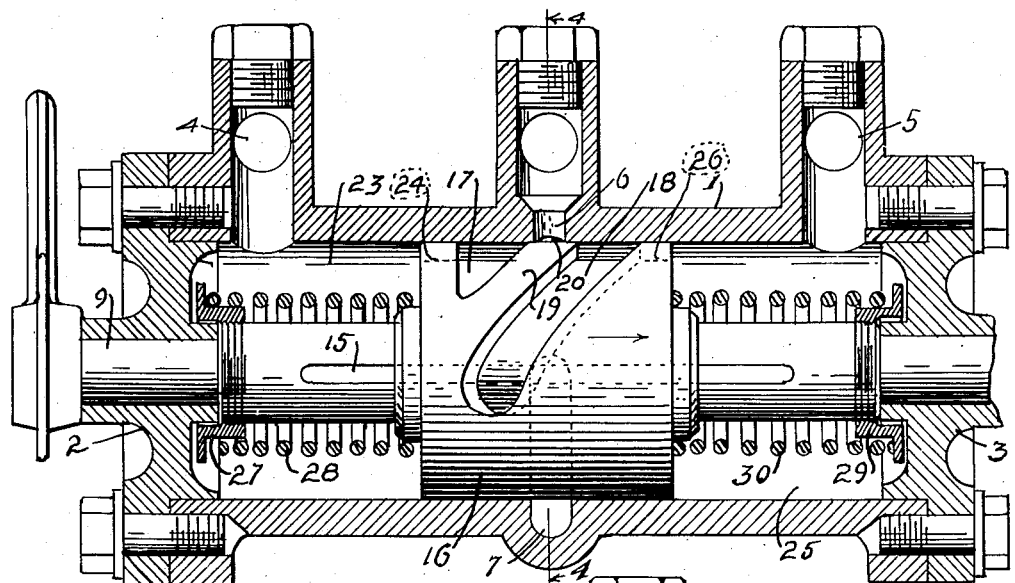
FIGURE 2
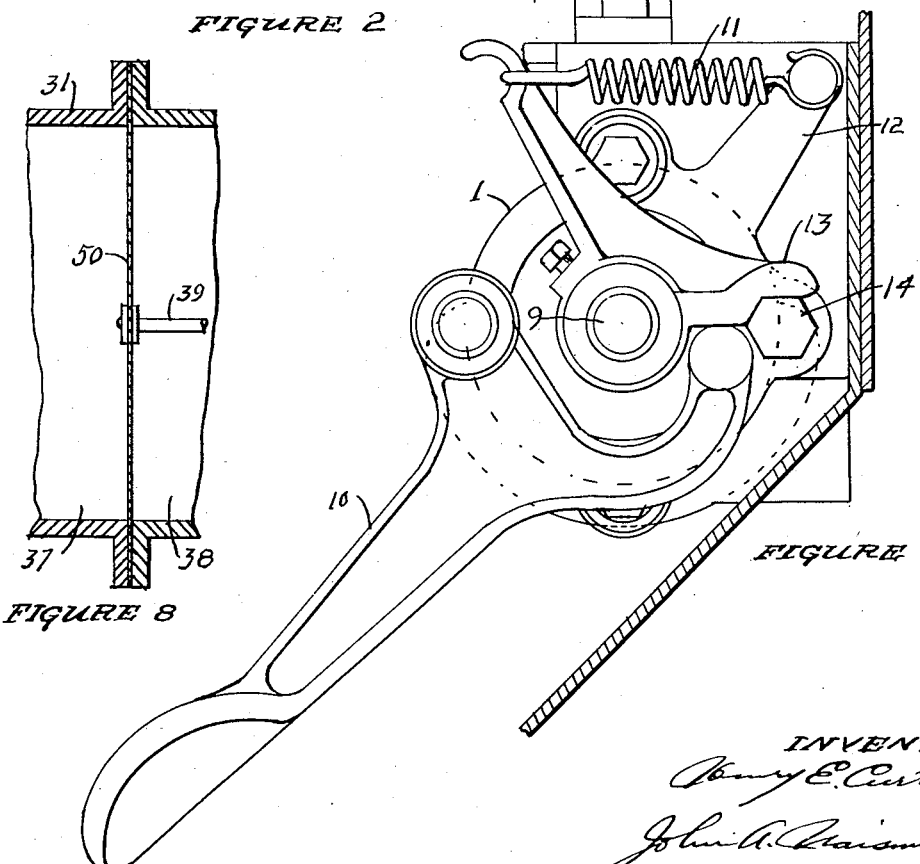
FIGURE 8
FIGURE 3
INVENTOR
Henry E. Curtis
John A. Naismith
ATTORNEY March 8, 1932. H. E. CURTIS 1,848,698
POWER TRANSMISSION AND CONTROLLING MEANS
Filed April 22, 1929 3 Sheets-Sheet 3

INVENTOR
Henry E. Curtis
John A. Arrowsmith
ATTORNEY

Patented Mar. 8, 1932

1,848,698

UNITED STATES PATENT OFFICE

HENRY E. CURTIS, OF SAN JOSE, CALIFORNIA

POWER TRANSMISSION AND CONTROLLING MEANS

Application filed April 22, 1929. Serial No. 357,210.

This invention relates particularly to a power transmission unit operable by either elastic or inelastic fluid pressure, and still more particularly to means for controlling the application of the fluid pressure.

One object of the invention is to provide a means of the character indicated that will apply the power smoothly and evenly and to a predetermined degree.

It is another object of the invention to provide a means of the character indicated that will be equally adaptable for use with and operable by a source of suction such as the intake manifold of an internal combustion engine, a liquid under pressure, or an elastic fluid under pressure.

It is also an object of the invention to provide a means of the character indicated that may be either automatic in operation or rendered operative at the will of the operator.

Still another object is to provide a device of the character indicated that will effectually lock itself in a predetermined operative position.

It is still another object of the invention to provide a means of the character indicated that will be simple in construction, economical to manufacture, of few parts, small and compact, durable and strong, and highly efficient in its practical application.

In the drawings:

Figure 1 is a diagrammatic illustration of the invention as applied to an internal combustion engine and the brake rod of a motor vehicle.

Figure 2 is a longitudinal section through the valve mechanism of the device, partly in elevation and partly broken away.

Figure 3 is an end elevation of the part shown in Figure 2.

Figure 6 is a transverse section through the valve mechanism connected to a source of liquid pressure, partly in elevation and part broken away.

Figure 7 is a partial end view of another embodiment of the invention.

Figure 8 is a detail section through a portion of another embodiment of the invention.

Figure 4:
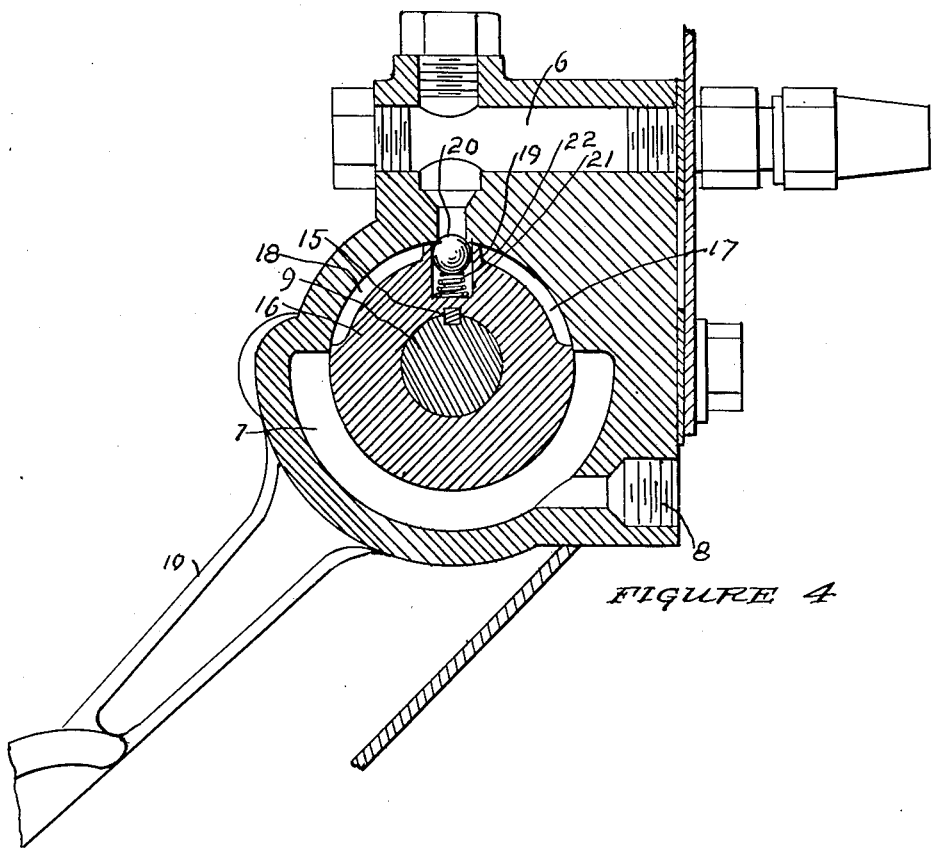
Figure 4 is a section on line 4—4 of Figure 2.
Figure 5:
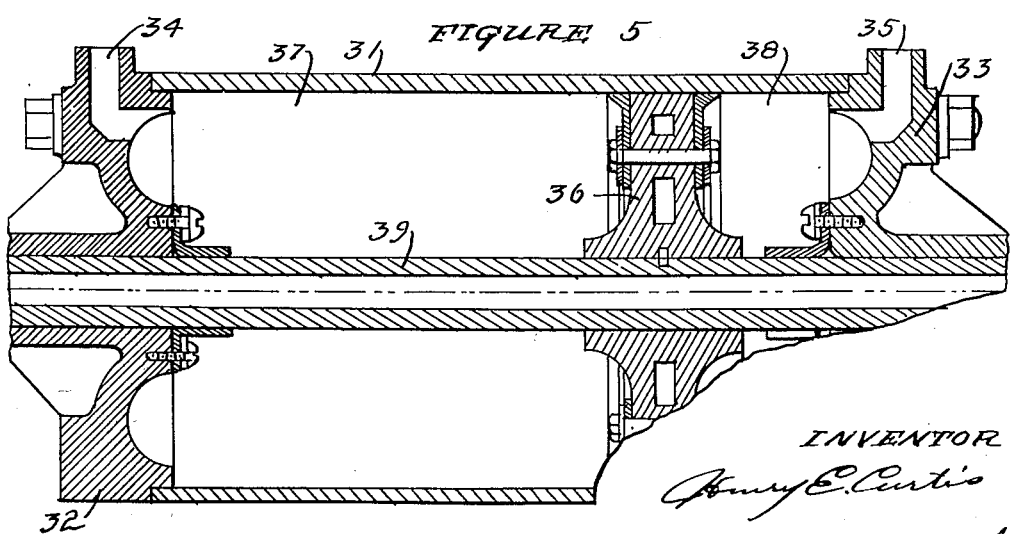
Figure 5 is a longitudinal section through the power cylinder of the device, part broken away.

Referring now more particularly to the drawings, I show at 1 a valve cylinder closed at both ends as at 2 and 3 and having a port communicating with each end as at 4 and 5 respectively. An intermediate port is disclosed at 6 and a passage is shown at 7 extending substantially half way round the inner wall of the cylinder in opposed relation to port 6 and communicating with the atmosphere as at 8.

Revolubly mounted in cylinder 1 is a shaft 9 which is operated in one direction by a foot pedal 10, and in the opposite direction by a spring 11 connected to an arm 12 on cylinder 1. The shaft is also provided with a stop finger 13 which is normally held in engagement with a stop as 14 by the spring 11.

Slidably mounted upon the shaft 9, but revolving therewith through the medium of key and keyway 15, is a valve member 16. This member is cylindrical in form and overlies the port 6 and passage 7 normally closing both of them. In the periphery of the member 16 are formed two passages as 17 and 18, separated by a helically disposed rib 19 having a ball valve 20 mounted therein as at 21 and supported on a spring 22. This ball valve normally closes the port 6. The passage 17 communicates with chamber 23 by means of conduit 24, and the passage 18 communicates with the chamber 25 by means of conduit 26, these chambers being formed by the enclosing walls of the cylinder and the valve member 16 placed therein.

A collar 27 is mounted on the shaft 9 within chamber 23 and adjacent the end 2 to form a seat for one end of the coiled spring 28 encompassing the shaft and bearing against the said collar and the opposing end of the valve member 16. A similar collar 29 is positioned in chamber 25 and on shaft 9 to form a seat for spring 30 which is inserted between it and the opposing end of member 16. By means of this construction the shaft 9, member 16, collars 27 and 29, and springs 28 and 30 all rotate as a unit, the collars effectually supporting the springs and eliminating friction between them and the ends of the chamber so that free and uniform movement of the member 16 is obtained at all times.

At 31 is shown another cylinder closed at both ends as at 32 and 33 but provided with end ports as 34 and 35. In this cylinder is mounted a piston 36 thereby dividing the cylinder into chambers 37 and 38. The piston is mounted upon a rod 39 passing through the ends of the cylinder and slidably actuated by movement of the piston. The ports 34 and 35 are connected to ports 4 and 5 of valve cylinder 1 by conduits 40 and 41, and port 6 in cylinder 1 is connected to a suitable source of suction as the intake manifold of an internal combustion engine 42 by means of a conduit 43.

Normally the member 16 is in the position shown in Figures 2 and 4, the passage 7 being closed at both ends and the port 6 being closed by the rib 19 and particularly by the ball valve 20 which the suction actuates to a perfect seal.

If, now, the pedal 10 is actuated to rotate the member 16 a distance so as to bring port 6 into communication with passage 18 then the suction through port 6, and drawing through conduit 26 (Fig. 2), will gradually reduce the pressure in chamber 25, conduit 41 and chamber 38. At the same time the passage 17 will be moved into communication with the passage 7 and the atmosphere, so that the chamber 23, conduit 40 and chamber 37 will likewise be thrown into communication with the atmosphere. This difference in pressure upon the opposite sides of the piston 36 causes it to move in the cylinder to perform useful work.

This first movement of the member 16 to throw the passage 18 into communication with port 6 was a relative movement about its axis, the angular formation of the rib 19 permitting this communication to become established after the member 16 had been rotated a predetermined distance. Since the springs 28 and 30, however, are balanced and normally hold the member 16 in its central position, the reduction of pressure in chamber 25 and the maintenance of atmospheric pressure in chamber 23 will cause the member 16 to move in the direction indicated by the arrow (Figure 2) until the rib 19 passes over and closes the port 6 and stops the suction therethrough.

As long as the foot pedal is held in the position taken the pressures in the two sides of the device will remain unchanged and the mechanism is locked, but immediately upon release of the pedal the spring 11 will rotate the member 16 back to its normal position, bringing passage 17 into registry with port 6 and passage 18 into registry with passage 7 whereby to instantly equalize the pressure in chamber 23, 25 and 37, 38 to return piston 36 to normal position. The suction now reduces the pressure in chamber 23 and the spring 30 moves member 16 back to its normal position.

An important feature of this invention is that when it is constructed to apply any given force from, say, one to fifty pounds on the rod 39, if the member 16 is rotated its maximum distance the force applied to rod 39 will build up to fifty pounds and lock the parts under that force until the member 16 is released and allowed to return to its normal position, and its movements when at work are smooth and without shock. Any force between the extreme limits may be quickly and smoothly and easily applied by rotating the member 16 a suitable distance.

In the embodiment shown in Figure 6 it is made clear that a liquid, as oil or water, under pressure may be used to secure the desired results. In this embodiment the water or oil pump 44 is connected by conduits 45 and 46 to the port 6 and passage 7, respectively, with a valved by-pass inserted between the two conduits as at 47. When the member 16 is rotated in either direction the liquid will pass through one passage 17 and 18 to one side of the piston 36 while the liquid on the other side of the piston will pass through the passage 7 back to the pump. When the valve member 16 is closed as shown in the figure then the liquid merely circulates through the pump and the valve 47. Of course, if it is desired to move the piston in the same direction as described in connection with the first disclosed embodiment and with a similar movement of member 16, then the passages 17 and 18 are connected to opposite chambers, the connection between passage 18 and chamber 23 being indicated at 48.

The embodiment shown in Figure 7 discloses a construction wherein the relative rotative movement between the cylinder 1 and the valve member 16 is secured through a freely swinging weight 49 mounted on the shaft 9. The weight is hung so that the valve port 6 is closed when the two members are in a normal position, but a rotative movement of either member will automatically open the port 6 and cause the device to function until the parts are returned to the said normal position.

In Figure 8 it is made clear that a diaphragm as 50 may be used in place of the piston 36 whenever occasion requires.

It is to be understood, of course, that while I have herein shown and described but certain specific embodiments of the invention, changes in form, construction, method of assembly and operation, may be made within the scope of the appended claims.

I claim:

1. In combination, a cylinder, a valve member mounted therein for axial and rotative movements and dividing the same into spaced chambers, a resilient means inserted between each end of the valve member and the opposing end of the cylinder, a port communicating with each chamber, a port communicating with the periphery of the valve member, the said valve member having separate passages formed therein to communicate with the end chambers and to communicate alternately with the last mentioned port when an axial or rotative movement is imparted to the valve member, the cylinder having another port communicating with the atmosphere and adapted to communicate with either of the said passages.

2. In combination, a cylinder having spaced intermediate fluid inlet and outlet ports formed therein, and axially movable and revoluble valve member mounted in the cylinder in operative relation to the intermediate ports, and dividing the cylinder into spaced chambers, each chamber having a port, said valve member being axially movable to vary the relative length of said chambers, oppositely acting resilient means mounted in the chambers to bear against said valve member, the valve member having separate passages formed therein and communicating with different chambers, each passage being selectively registerable with both of said intermediate ports, and means for rotating said valve to effect registry of one of said passages with one of said intermediate ports whereby to cause the exhaustion of fluid from one chamber port and the supply of fluid to the other chamber port.

3. In combination, a cylinder having a revoluble valve member mounted therein to divide the same into chambers, said valve member being axially slidable to vary the size of the chambers, each chamber having a port communicating therewith, oppositely acting resilient means bearing against the valve member to normally hold it in a given position in the cylinder, a port formed in the cylinder communicating with the periphery of the valve member, a passage formed in the cylinder communicating with the periphery of the valve member, one of said cylinder port and passage portions providing a fluid inlet and the other a fluid outlet, the valve member having separate passages formed therein communicating with the said chambers and adapted upon rotation of said valve to communicate with said last mentioned port and passage.

4. In combination, a cylinder having an axially movable and revoluble valve member mounted therein to divide the same into chambers, each chamber having a port communicating therewith, oppositely acting resilient means bearing against the valve member to normally hold it in a given position in the cylinder, a port formed in the cylinder communicating with the periphery of the valve member, the valve member having passages formed in its periphery and of such a configuration that a rotative movement of the member in either direction will effect the registration of one of them with said last mentioned port, and each of said passages communicating with one of said chambers, the cylinder having a passage formed therein communicating with the atmosphere and adapted to communicate with either of said valve member passages when the valve member is rotated, and the valve being slidable under fluid action to vary the size of said chambers.

5. In combination, a cylinder having end ports and spaced intermediate fluid inlet and outlet ports formed therein, an axially movable and revoluble valve member mounted in the cylinder in operative relation to the intermediate ports and dividing the cylinder into chambers, oppositely acting resilient means bearing against the opposite ends of the valve member to hold the same in a given position, the valve member having separate passages formed therein and each communicating with one of said chambers, and both of said passages being adapted for interchangeable simultaneous registry with said intermediate ports when the valve member is rotated, said valve member being axially movable to vary the dimensions of said chambers.

6. In a device of the character described, a cylindrical valve member having passages formed in its periphery to form a helically disposed peripheral rib, each of the passages having communication with one end of the valve member, and a combined locating stop and check valve portion carried by said valve member.

7. In combination, a cylinder having a port communicating with each end thereof, a valve member mounted therein to form end chambers and having passages formed in its periphery to form a helically disposed peripheral rib, each passage having communication with one of said chambers, the valve being axially and revolubly movable in the cylinder, means for normally holding the valve member in a given position in the cylinder, the cylinder having a port formed therein normally closed by the valve member rib but registrable with either of the valve passages when the valve is moved, said rib having a yieldable element normally seating in said cylinder port and constituting a valve closure therefor, and the cylinder having a passage formed therein communicating with the atmosphere and registrable with either of the valve passages when the valve is moved, one of the characteristic movements of the valve member, as above set forth, effecting registry of the passage and port and the other characteristic movement of said valve member relatively changing the size of said chambers.

8. In combination, a power cylinder having a piston operatively mounted therein, a valve cylinder having an axially movable and revoluble valve member mounted therein to divide the same into chambers, conduits connecting said chambers with opposite sides of the piston in the power cylinder, the valve cylinder having a passage formed therein communicating with the atmosphere and with the periphery of the valve member and a port communicating with the periphery of the valve member, the valve member having passages formed therein communicating with the cylinder chambers and movable into registration with the passage and port in the cylinder, and resilient means for normally holding the valve member in an inoperative position, the movable characteristics of said valve member permitting variable registration of valve member passages with said cylinder port and passage.

9. In combination, a cylindrical valve member having passages formed in its periphery to form a helically disposed rib, each passage having communication with one end of the valve member, a cylinder encompassing the valve member and forming a chamber at each end thereof, and having a port communicating with each chamber, the said cylinder also having a port formed therein normally closed by the valve member rib and having a passage formed therein communicating with the atmosphere and normally closed by the valve member, the last mentioned port being thrown into communication with one passage in the valve member and the cylinder passage being thrown into communication with the other passage in the valve member when the valve member is rotated, and resilient means to normally hold the valve member passages out of communication with the cylinder passage and port.

10. In combination, a cylindrical valve member having passages formed in its periphery to form a helically disposed rib, each passage having communication with one end of the valve member, a ball valve resiliently mounted in the rib, a cylinder encompassing the member and forming a chamber at each end thereof and having a port formed therein normally closed by said ball valve, the said member being axially movable and revoluble in the cylinder, balanced resilient means for normally holding the member against axial movement in the cylinder, the said cylinder having a port formed therein communicating with each chamber, and a passage formed therein communicating with the atmosphere and registrable with one of the passages in the valve member when the member is rotated.

11. In combination, a power cylinder having disconnected chambers formed therein, a movable power transmitting device inserted between the chambers, and means for varying the fluid pressure on opposite sides of the device to move said device in opposite directions, said means comprising a valve controlled source of fluid energy, communicating with both of said chambers and means for actuating the valve, said valve actuating means including balanced resilient means mounted to bear against the opposite ends of the valve, and said valve having a yielding combined port-sealing portion and stop.

12. In a device of the character described, a cylinder, a revoluble and axially movable valve member mounted therein, one of the said characteristic movements of said valve member regulating a fluid flow, and the other characteristic movement varying the cubical area of the cylinder at opposite sides of said valve member, a shaft for the member extending therethrough, said valve member being slidably keyed to said shaft, a collar mounted on the shaft on each side of the valve member, and a resilient element inserted between each collar and the opposing end of the valve member.

13. In a device of the class described, a cylinder, a shaft revolubly mounted therein, a valve member mounted on the shaft to revolve therewith and axially adjustable relative thereto, supporting means mounted on the shaft on each side of the valve member and rotating therewith, and resilient means mounted on each supporting member to bear against opposite sides of the valve member, said valve member and cylinder having cooperating fluid flow portions variably cooperable in the relative axial and rotative adjustment of said valve member.

14. In a device of the character described, a unitary valve structure comprising a shaft, a valve member mounted thereon for axial adjustment relative thereto, said shaft being rotatable whereby with the axial valve adjustment to permit production of varied fluid control, spring supporting means positioned on the shaft on opposite sides of the valve member, and springs inserted between the supporting means and the opposing ends of the valve member.

15. In a device of the character described, a rotatable shaft, a valve member mounted thereon to rotate therewith and axially movable relative thereto, whereby to variably dispose flow control portions of said valve with respect to a valve casing to variably control fluid flow, and balanced resilient means bearing against opposite ends of the valve member and connected to the shaft to rotate as a unit therewith.

HENRY E. CURTIS.